J. L. BREEDING.
COTTON CHOPPER.
APPLICATION FILED APR. 21, 1910.
993,342.
Patented May 30, 1911.
3 SHEETS—SHEET 1.
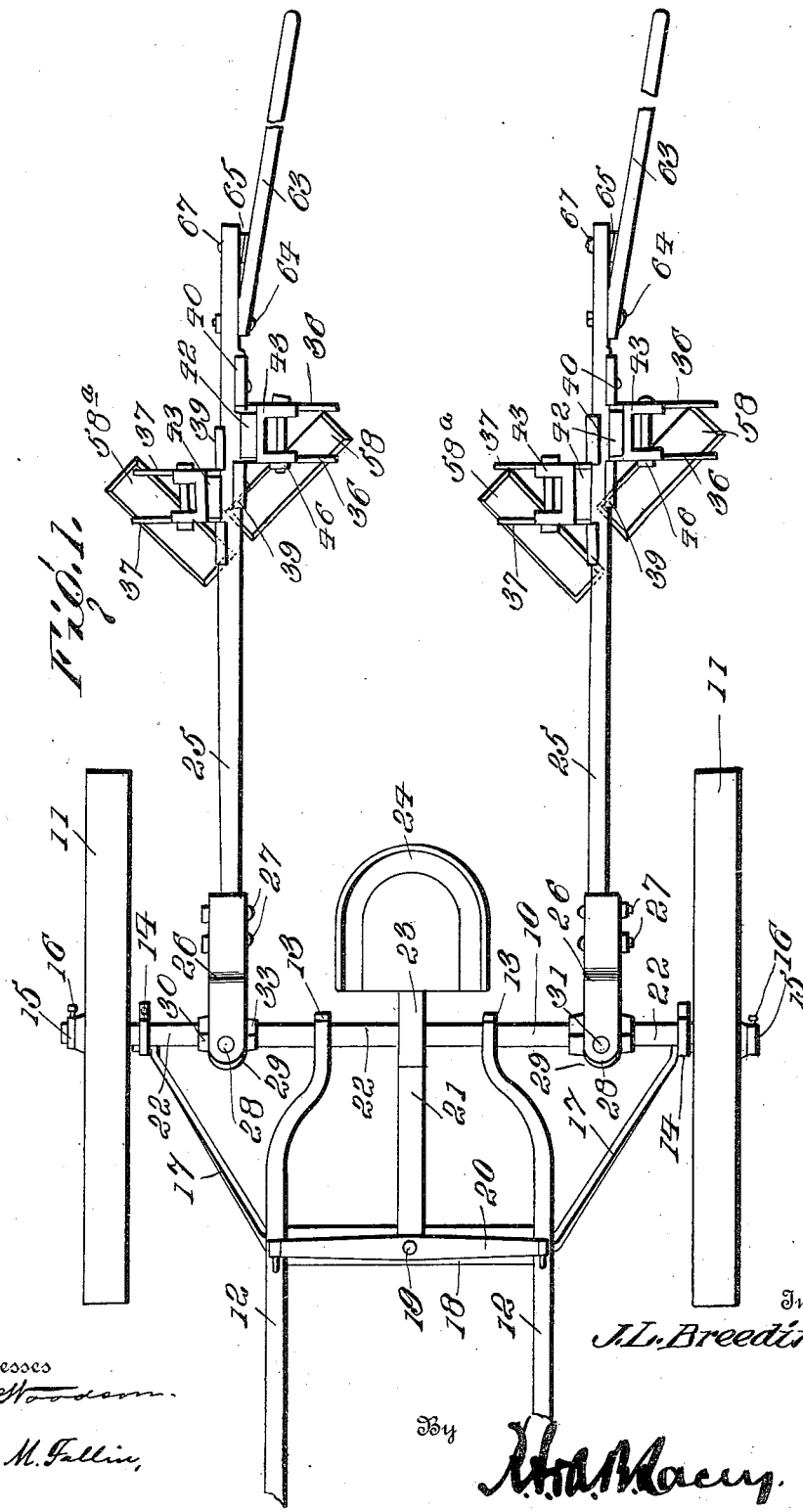

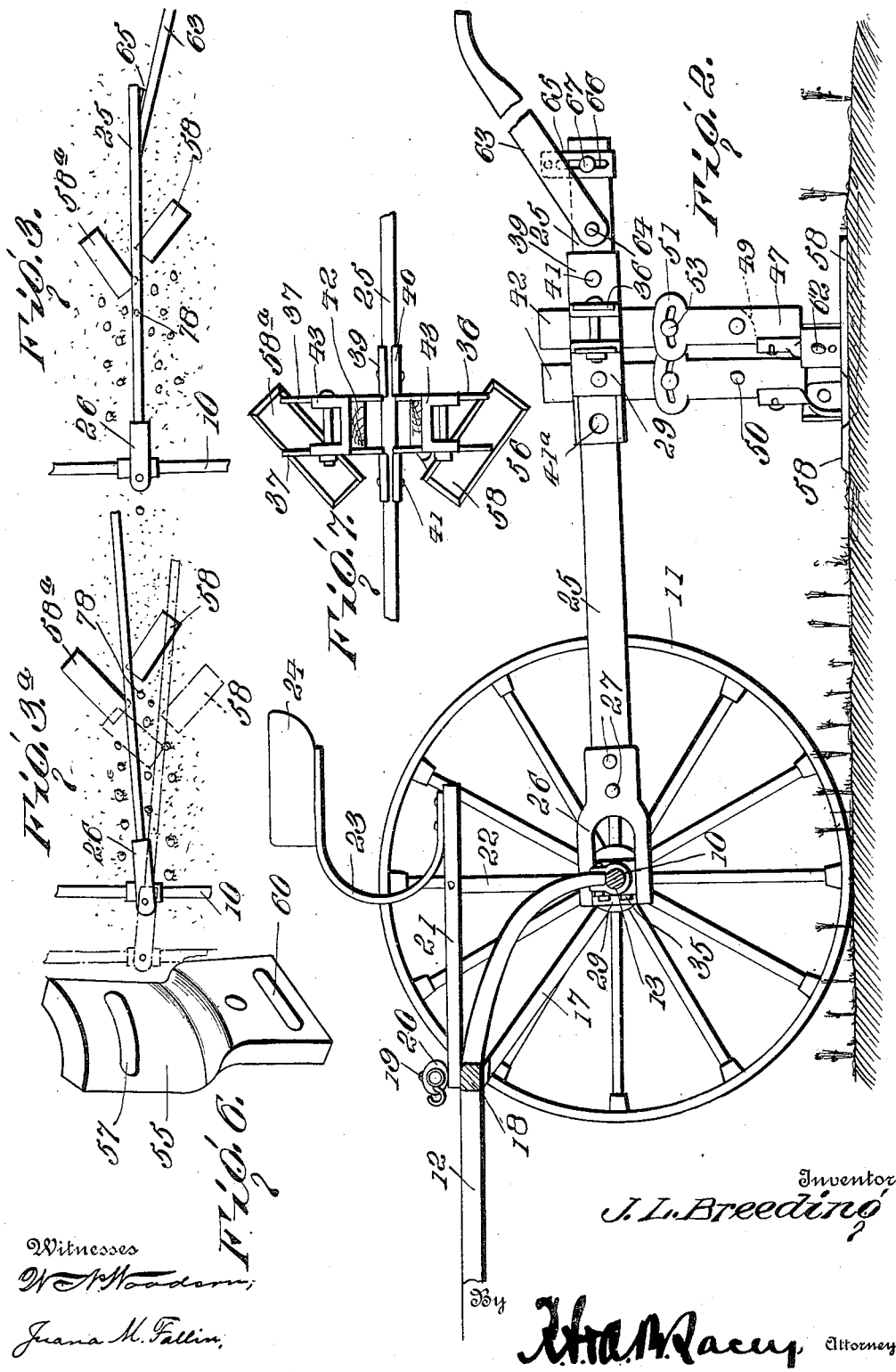

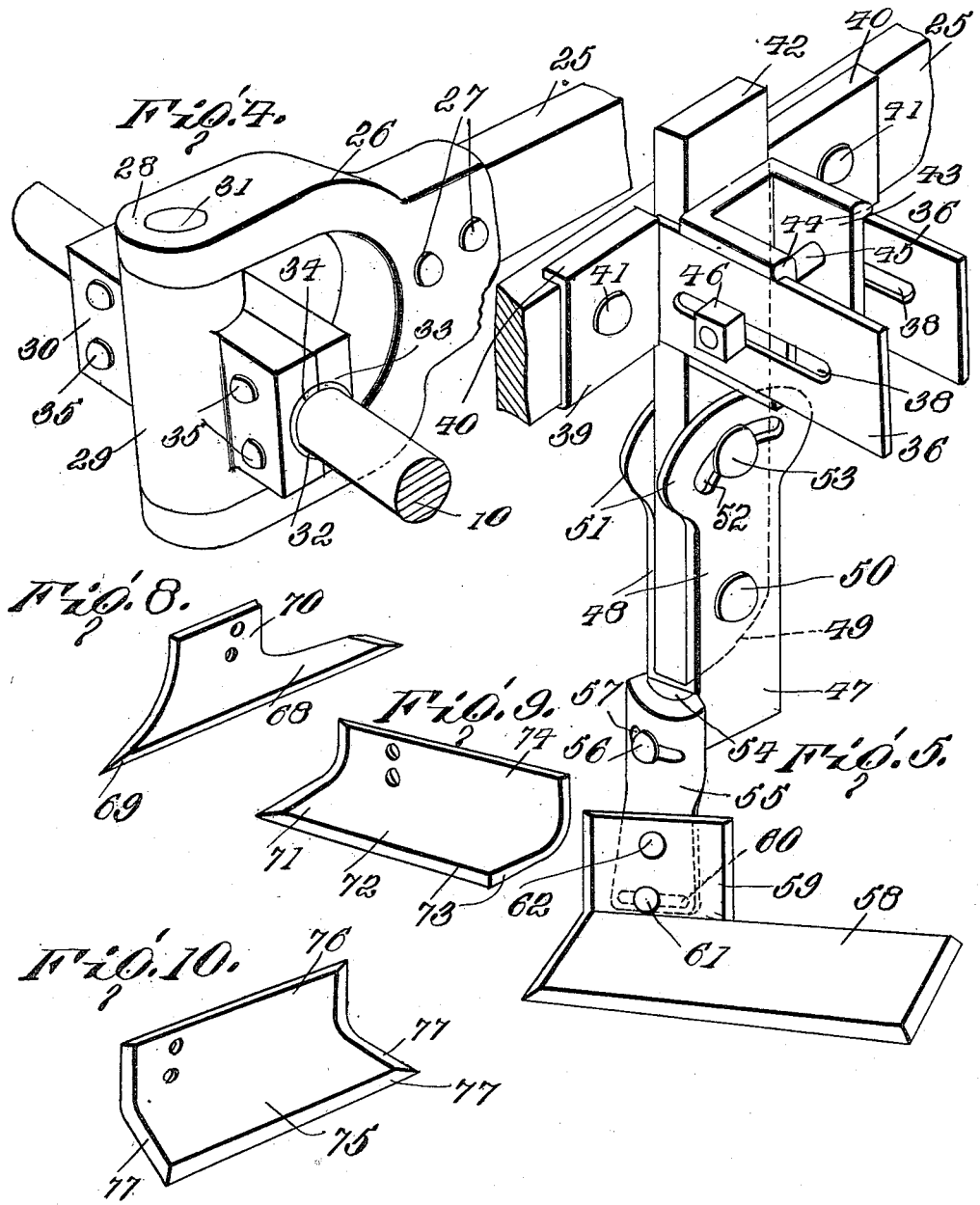

UNITED STATES PATENT OFFICE.

JAMES L. BREEDING, OF PERRY, OKLAHOMA.

COTTON-CHOPPER.

993,342. Specification of Letters Patent. Patented May 30, 1911.

Application filed April 21, 1910. Serial No. 556,672.

*To all whom it may concern:*

Be it known that I, JAMES L. BREEDING, a citizen of the United States, residing at Perry, in the county of Noble and State of Oklahoma, have invented certain new and useful Improvements in Cotton-Choppers, of which the following is a specification.

This invention relates to cotton choppers and has for an object to provide a machine with which the chopping of two rows of cotton may be simultaneously effected, which may be drawn by one draft animal, and in which the chopping elements may be independently operated to chop plants from the row as desired irrespective of the varying distances between them.

The invention has for another object to construct a machine of this nature wherein a hinged beam is provided with longitudinally spaced chopping elements which are disposed in diagonal and overlapping relation on the beam, to normally cut all of the plants from the row, and with a handle by means of which the beam may be swung laterally to direct the choppers about predetermined plants to be left in the row. With this form of chopper the operator can readily gain sufficient skill to swing the beam when desired so as to leave the plants desired in the row irrespective of the distances between the plants. The operator is thus given complete control over the action of the machine.

Another object of this invention is to form a machine of this character wherein the chopping elements may be adjusted upon the hinged beam so as to cut grass or weeds from the side of the row, when a row is to be cultivated which is choked with grass or weeds, prior to the chopping out of the plants and grass in the row between the stalks which are to remain.

The invention further comprehends the peculiar construction and arrangement of the several parts which constitute the chopper to admit of various adjustments whereby the machine is adapted to the various stages of the cultivation of cotton or the like.

For a full understanding of the invention reference is to be had to the following description and accompanying drawings, in which:

Figure 1 is a top plan view of the complete chopping machine. Fig. 2 is a longitudinal central section through the same. Fig. 3 is a diagrammatic view of one of the hinged beams in a normal position over the row to cut all of the plants from the row. Fig. 3ª is a similar view showing in full lines the beam swung to one side of the row to avoid a plant in the row, the dotted lines showing the beam swung in the opposite direction after passing the plant which is to remain in the row. Fig. 4 is a detail perspective view of one of the hinged couplings between the axle and the beam. Fig. 5 is a detail perspective view of one of the standards and its attachments which are carried upon the beam. Fig. 6 is a detail perspective view of the foot carried by the standard. Fig. 7 is a top plan view of one of the beams having the standards thereon adjusted in parallel relation. Figs. 8, 9 and 10 are detail perspective views of modified forms of choppers adaptable for operation in connection with the machine.

Corresponding and like parts are referred to in the following description and indicated in all the views of the drawings by the same reference characters.

Referring to the drawings, the numeral 10 designates an axle which is formed preferably from a straight length of piping, and which is provided upon its opposite ends with suitable wheels 11.

The frame of the improved chopper is carried upon the axle 10 and essentially comprises a pair of shafts 12 which are turned inwardly or converged at their inner ends, and are secured in spaced relation upon the central portion of the axle 10 through the medium of suitable collars 13. Split collars 14 are adjustably positioned upon the ends of the shaft 10 against the inner sides of the hubs of the wheels 11 and coöperate in conjunction with collars 15 upon the extremities of the axle 10 to adjustably hold the wheels 11 upon the ends of the axle. The collars 15 are adjustably secured upon the axle 10 through the medium of set screws 16. Diagonal braces 17 are carried at their lower ends upon the brace 14 and extend forwardly and upwardly to engage beneath a cross brace 18 which is disposed between the shafts 12. The cross brace 18 carries at its central portion a pivot pin 19 to which is hinged a swingle tree 20. Carried upon the pivot pin 19, and interposed between the cross brace 18 and the swingle tree 20, is a bar 21 which extends rearwardly over the pin 19 and is suitably supported upon vertical braces 22 extending upwardly from the split collars 14. A spring seat post 23 is mounted upon the rear end of the bar 21, the bar extending slightly beyond the vertical braces 22. A seat 24 of any adaptable form is carried upon the post 23. Carried upon this frame and adjacent the ends of the axle are a pair of adjustably spaced beams 25. Each of the beams 25 is provided at its forward end with a coupling 26 in the form of a plate having a recess in its inner side for the reception of the forward extremity of the beam 25. The beam is held against the plate of the coupling 26 by bolts 27 or the like which pass through the plate and through the forward extremity of the beam. The coupling 26 terminates at its opposite or outer end in fork arms 28 which engage against the opposite ends of a cylindrical bearing 29 interposed between the outer extremities thereof. The bearing 29 is integrally formed intermediately of the ends of a plate 30, and is provided with a vertical pin 31 to hingedly support the coupling. The plate 30 is provided upon its inner face with a semi-circular and longitudinal groove 32, the groove 32 corresponding to a similar groove formed in a companion plate 33 to receive therethrough a portion of the axle 10. A lining 34 of soft leather or a like substance is positioned within the grooves of the companion plates 30 and 33 to provide a binding element between the plates and the axle. The companion plates 30 and 33 carry clamping bolts 35 which are passed through their outer ends and adjacent the longitudinal edges thereof so as to bind the plates against the sides of the axle 10. The couplings are thus mounted upon the axle for vertical adjustment and for lateral swinging movement.

The rear end of each of the beams 25 is provided at its opposite sides with a pair of spaced guides 36 and 37. Each of the guides is formed of a pair of elongated plates having longitudinal slots 38 arranged centrally therein and in registered relation, and are formed with outturned flanges 39 to rest against the sides of the beam 35. The guides extend outwardly and in parallel and spaced relation from the beam 25. Each of the flanges 39 is provided with overturned lips 40 at its upper edges to snugly fit against the upper and lower edges of the beam 25. Bolts 41 are positioned through the flanges 39 and the beam 25 to retain the guides in position. The beam 25 is provided with a plurality of longitudinally spaced openings 41ª to receive the bolts 41 and thereby admit of the adjustment of the guides 36 and 37.

Referring particularly to Fig. 5 of the drawings, a standard 42 is arranged between the guides 36 and is provided upon its outer face with a slide 43. The slide 43 comprises a U-shape or channel member having the flanges or arms thereof extending outwardly from the standard 42 and disposed in horizontal alinement. The slide 43 fits snugly against the inner faces of the guides 36 and it is held from vertical movement therebetween by forming beads 44 upon the longitudinal edges of the opposite arms thereof. The slide 43 is provided with an adjusting bolt 45 which is transversely disposed through the arms of the slide and extends through the slot 38. The head of the bolt 45 engages the outer face of one of the guides 36 as is disclosed in Figs. 1 and 2, while the threaded extremities of the bolt carry a nut 46 to bind against the outer face of the opposite guide 36. The lower extremity of the standard 42 is provided with a block 47 which is in the form of a casting having spaced webs 48 to rest against the opposite sides of the standard, the body of the block 47 having a rounded inner face to snugly fit against the lower correspondingly formed extremity 49 of the standard 42. A bolt 50 is passed through the webs and lower end of the standard 42 to pivotally hold the block 47 upon the standard. The upper ends of the webs 48 are enlarged as at 51 and provided with arcuate slots 52 through which is disposed a bolt 53 rigidly carried through the standard 42. The bolt 53 is employed for the purpose of clamping the webs 48 against the sides of the standard 42 to adjust the block 47 into the desired angle. The lower extremity of the block 47 is provided with a rounded forward edge 54 against which is positioned the foot 55 of the chopper. The foot 55 is formed of a casting, the upper end of which comprises a curved plate to seat against the rounded edge 54 and to which the same is secured through the medium of the bolt 56. The foot 55 is provided in the rounded portion thereof with a transverse slot 57 to admit of the angular adjustment of the foot relative to the block 47. The lower end of the foot 55 is flattened and turned at an angle approximating 30° to the plane of the curved plate. The direction in which the flattened portion of the foot is curved is dependent upon the side of the beam 25 upon which the foot 55 is to be positioned. The flattened portion of the foot is curved outwardly so as to support the hoe or chopper 58 obliquely in a backwardly extending position relative to the beam 25.

The chopper 58, as disclosed in Fig. 5, is formed of a sheet of metal which is beveled or provided with a cutting blade at its forward and side edges so as to admit of the cutting action of the chopper as the beam 25 is swung laterally. The inner end of the chopper 58 is provided with a support 59 in the form of an upstanding web or flange which is integrally formed with the chopper 58 and upon its rear edge. The flattened portion of the foot 55 has a transverse slot 60 in its lower extremity to receive an adjusting bolt 61 which is positioned therethrough and through the support 59, a retaining pin 62, which may be in the form of a bolt is passed through the upper end of the support 59 and the flattened portion of the foot 55.

The rear end of each of the beams 25 is provided with a handle 63 which comprises an elongated member hinged upon a pin 64 carried by the beam 25, the handle 63 extends backwardly and to one side of the beam to admit of the holding of the handle by the operator while walking at one side of the row. The handle 63 carries a depending arm 65 which is hinged thereto and which rests against one side of the beam 25. The arm 65 is provided with a longitudinal slot 66 to receive a clamping bolt 67 therethrough. The bolt 67 is carried by the beam 25 and holds the handle 63 in various vertically adjusted positions.

In Fig. 8 of the drawings is disclosed a modified form of chopper which comprises a flattened plate 68 having a pointed inner end 69 and being beveled to form a cutting blade upon each of the edges thereof. The point 69 is adapted to penetrate and to cut sod and the like which usually offers a considerable resistence to the chopper. The chopper is provided with a support 70 extending upwardly therefrom adjacent the inner end for engagement against the flattened portion of the foot 55.

Fig. 9 shows another modified form of the chopper. This form comprises a rectangular plate which is curved longitudinally midway of its longitudinal edges and having one of the corners thereof elongated to form the point 71. The body portion 72 of the chopper is provided upon its three edges with cutting blades 73. The upturned or rear end of the plate forms a suitable support 74 for attachment to the foot 55. The end blades 73 are continued from the body 72 upwardly at the ends of the support 74. In this form the plate is not at a sharp angle but is gradually curved outwardly at its rear end, the curvature being decreased at the outer end of the chopper so as to deflect weeds or the like which are passed over the upper face of the chopper 72 away from the row.

Fig. 10 shows a chopper 75 which is formed of a rectangular plate being upturned longitudinally to form the support 76. Cutting edges 77 are formed at the ends of the and at its forward edge.

The choppers which have been shown and described in the specification have been for the left hand side of the beam 25, and it will be readily understood that it involves the mere changing of the angles of the foot 55 and of the choppers, and of the positioning of the support upon the choppers at the opposite end to form the right hand chopping device.

In the operation of the chopper the wheels 11 are adjusted to straddle two rows of the cotton plants. The couplings 26 are so adjusted upon the frame as to dispose the beams 25 in longitudinal alinement over the rows. The guides 36 and 37 are arranged against the opposite sides of the beams 25 in spaced longitudinal relation as is disclosed to advantage in Fig. 1.

Referring particularly to Figs. 3 and 3ª, when the implement is drawn over two rows of the growing plants, each beam 25 normally assumes a position in longitudinal alinement with and directly over the row of plants, as is disclosed in Fig. 3. In this instance the choppers 58 and 58ª cut all of the plants out of the row as their inner ends overlap. When the choppers approach a plant 78 which is to be left standing in the row, the beam 25 is swung to the right, as is disclosed in Fig. 3ª. In this position the beam 25 travels forwardly, when the inner end of the chopper 58ª passes the plant 78 and the inner end of the chopper 58 approaches the plant. The beam 25 is now given a movement to the left of the row to assume the position disclosed in dotted lines in Fig. 3ª. During this movement of the beam 25 to the left the choppers 58 and 58ª pass in spaced relation against the opposite sides of the plant 78, and the plant 78 passes through the channel made by the spacing of the rear edge of the chopper 58ª forwardly from the forward end of the chopper 58. The swinging movement of the beam 25 is very slight since it is only necessary to move the beam 25 to the right to a distance sufficient to clear the plant 78. The opposite movement is made through a distance sufficient only to clear the forward end of the chopper 58 from the plant 78. It will thus be seen that during the movement of the implement the operator can readily acquire the skill required in swinging the beam 25 to clear the plant which he desires to retain in the row. It is also observed that the operation of the choppers 58 and 58ª are not dependent upon a mechanical means which allows a plant to remain in the row at equidistant spaces apart, but that the choppers are under the control of the operator to allow any desired plant to remain in the row irrespective of the distances between the same.

When the row to be cultivated is overrun with weeds and grass, it is necessary to cut the weeds and grass from the sides of the row. To adapt this improved cotton chopper to this stage of the cultivation of the cotton, the guides 37 are positioned against the beams 25 in transverse registration with the guides 36 and the slides 43 are adjusted outwardly between the guides to space the choppers or hoes 58 and 58ᵃ apart a distance equal to the width of the row. With this adjustment the row may be freed from weeds and grass with the exception of a narrow strip at each side of and between the plants. The machine is now adjusted as is disclosed in Figs. 1 and 2, and the desired plants are eliminated from the rows together with weeds, grass or the like.

Having thus described the invention, what is claimed as new is:

1. A cotton chopper including a frame, hinged beams carried by the frame for vertical and lateral movement, guides arranged in pairs for longitudinal adjustment against the opposite sides of the beams, a standard depending from each pair of guides, and choppers mounted upon the lower ends of the standards.

2. A cotton chopper including a frame, hinged beams carried by the frame, guides arranged in pairs for adjustment against the opposite sides of said beams, slides arranged between the guides for transverse adjustment relative to the beam, standards rigidly carried upon the slides, adjustable blocks arranged upon the lower ends of the standards, a foot adjustably disposed upon the lower end of each of the blocks, and choppers mounted for adjustment upon each foot.

3. A cotton chopper including a frame, hinged beams carried by the frame, guides adjustably disposed in pairs against the opposite sides of said beams, slides engaged between the guides, standards carried on the slides, clamping bolts secured through the guides and through said slides, adjustable blocks disposed upon the lower ends of said standards, and diagonally arranged choppers carried upon said blocks.

In testimony whereof, I affix my signature in presence of two witnesses.

JAMES L. BREEDING. [L. S.]

Witnesses:
WALTER S. POWERS,
E. B. FLEMING.

---

Copies of this patent may be obtained for five cents each, by addressing the "Commissioner of Patents, Washington, D. C."